H. B. COOLEY.
ENVELOP MACHINE.
APPLICATION FILED JUNE 18, 1913.

1,219,407.

Patented Mar. 13, 1917.
6 SHEETS—SHEET 1.

WITNESSES:
Louis Lucia
C. F. Eaton

INVENTOR:
Henry B. Cooley,
BY
Arthur C. Jenkins,
ATTORNEY.

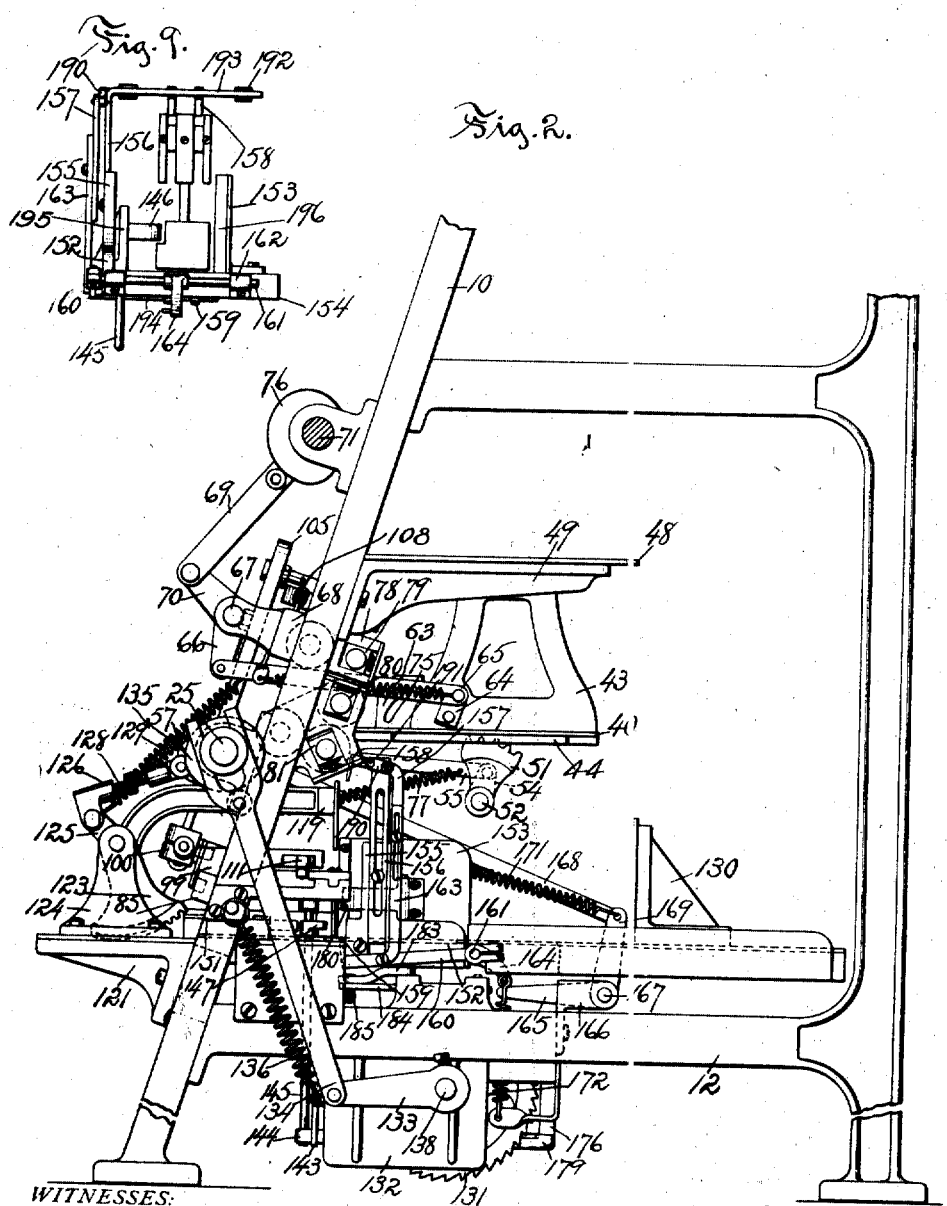

H. B. COOLEY.
ENVELOP MACHINE.
APPLICATION FILED JUNE 18, 1913.
1,219,407.
Patented Mar. 13, 1917.
6 SHEETS—SHEET 3.
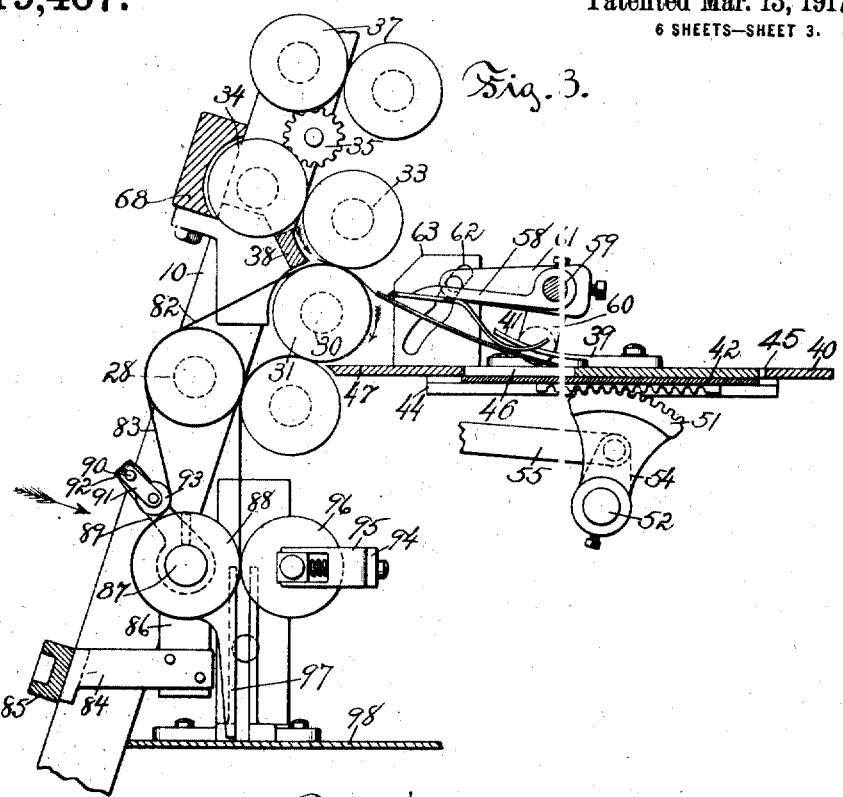
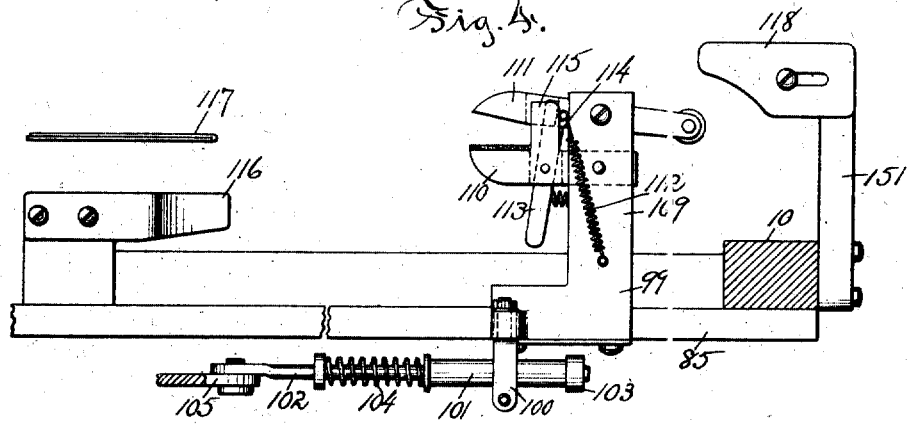
WITNESSES:
Louis Lucia
E. F. Eaton
INVENTOR.
Henry B. Cooley,
BY
Arthur B. Jenkins,
ATTORNEY.

H. B. COOLEY.
ENVELOP MACHINE.
APPLICATION FILED JUNE 18, 1913.
1,219,407.
Patented Mar. 13, 1917.
Fig. 5.
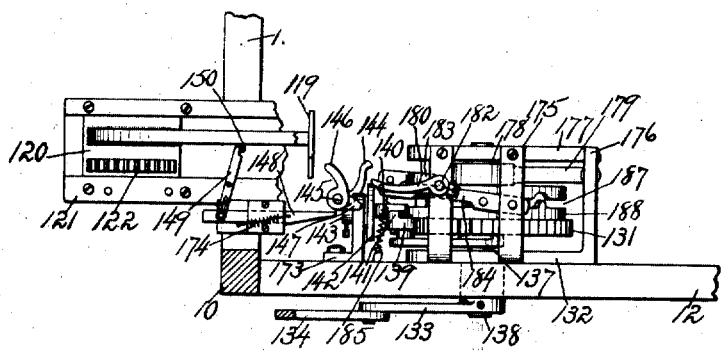
Fig. 6.
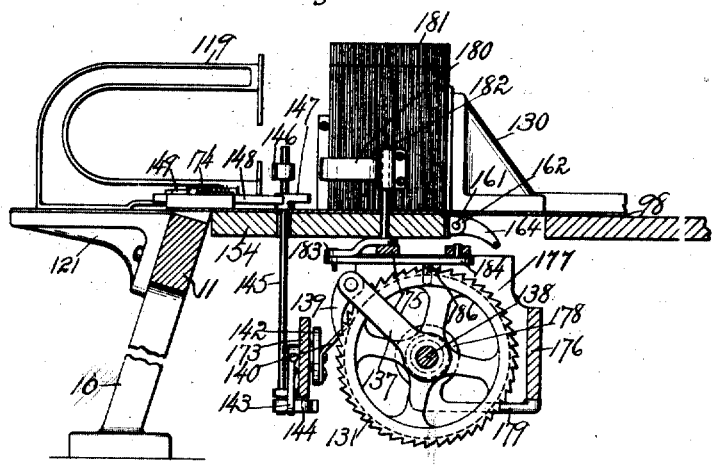
Fig. 7.
WITNESSES:
James Lucia.
C. F. Eaton
INVENTOR.
Henry B. Cooley,
BY
Arthur C. Jenkins
ATTORNEY.

H. B. COOLEY.
ENVELOP MACHINE.
APPLICATION FILED JUNE 18, 1913.

1,219,407.

Patented Mar. 13, 1917.
6 SHEETS—SHEET 5.

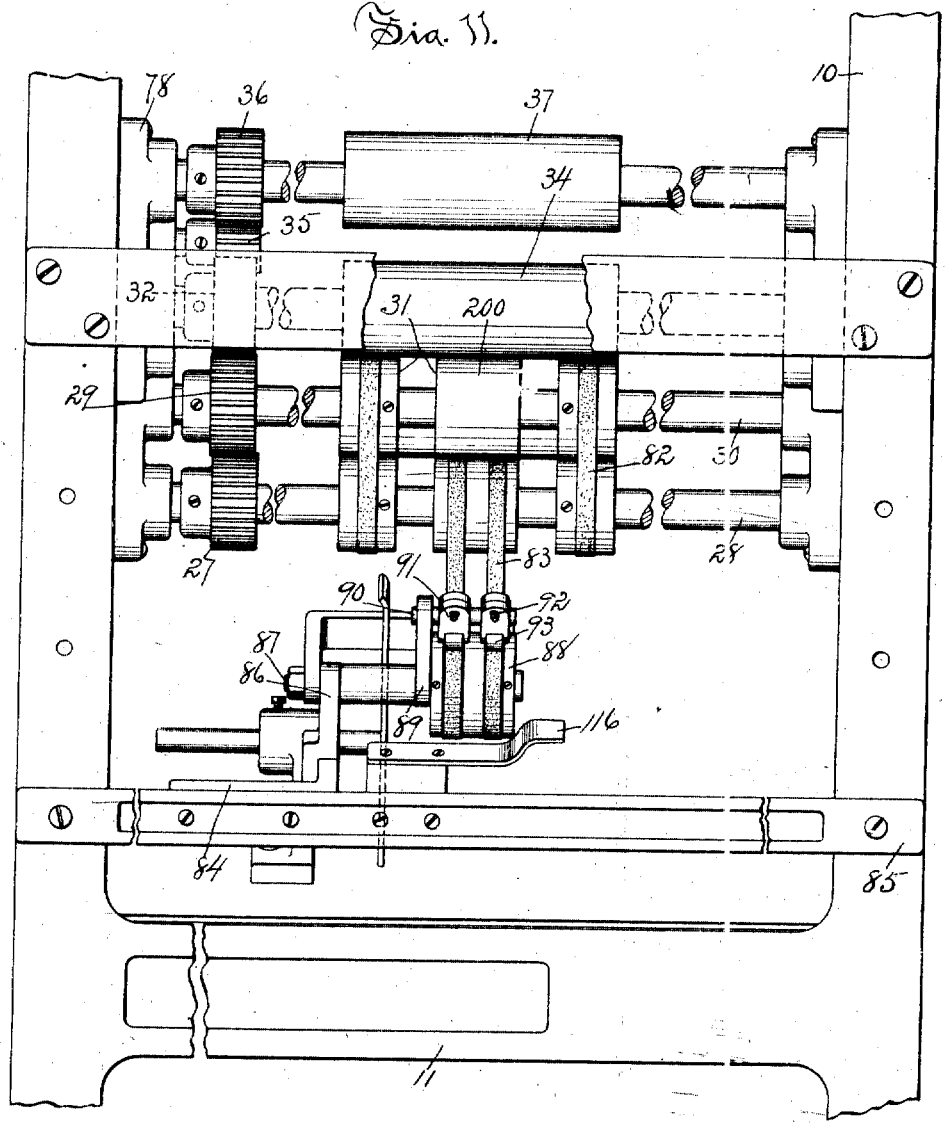

UNITED STATES PATENT OFFICE.

HENRY B. COOLEY, OF NEW BRITAIN, CONNECTICUT, ASSIGNOR TO THE AMERICAN PAPER GOODS COMPANY, OF MONTCLAIR, NEW JERSEY, A CORPORATION OF NEW JERSEY.

ENVELOP-MACHINE.

1,219,407.

Specification of Letters Patent.

Patented Mar. 13, 1917.

Application filed June 18, 1913. Serial No. 774,341.

*To all whom it may concern:*

Be it known that I, HENRY B. COOLEY, a citizen of the United States, and a resident of New Britain, in the county of Hartford and State of Connecticut, have invented a new and Improved Envelop-Machine, of which the following is a specification.

My invention relates to the class of machines above named and an object of my invention, among others, is to provide a machine of this class that may be readily adapted to perform a variety of operations in the making of envelops; and a further object of the invention is to increase the efficiency of machines of this class.

One form of device embodying my invention and in the construction and use of which the objects hereinabove set out, as well as others, may be attained, is illustrated in the accompanying drawings, in which—

Fig. 2 is a view in side elevation of the same, the stop for the envelops being removed.

Fig. 3 is a diagrammatic view (scale enlarged) illustrating the relative arrangement of the rolls.

Fig. 4 is a detail view, (scale enlarged) illustrating the construction and operation of the transferring mechanism.

Fig. 5 is a detail top plan view illustrating the construction and operation of the counting mechanism, the receiving table being removed.

Fig. 6 is a view in side elevation of the same, the stop for the envelops being omitted.

Fig. 7 is a detail view further illustrating the operation of the counter.

Fig. 9 (Sheet 2) is a detail view further illustrating the construction of the pusher and its coöperating parts.

Fig. 11 is a diagrammatic front view, scale enlarged, of the rolls shown in Fig. 3, the plane of view being indicated by the arrow in said Fig. 3.

Figure 1:
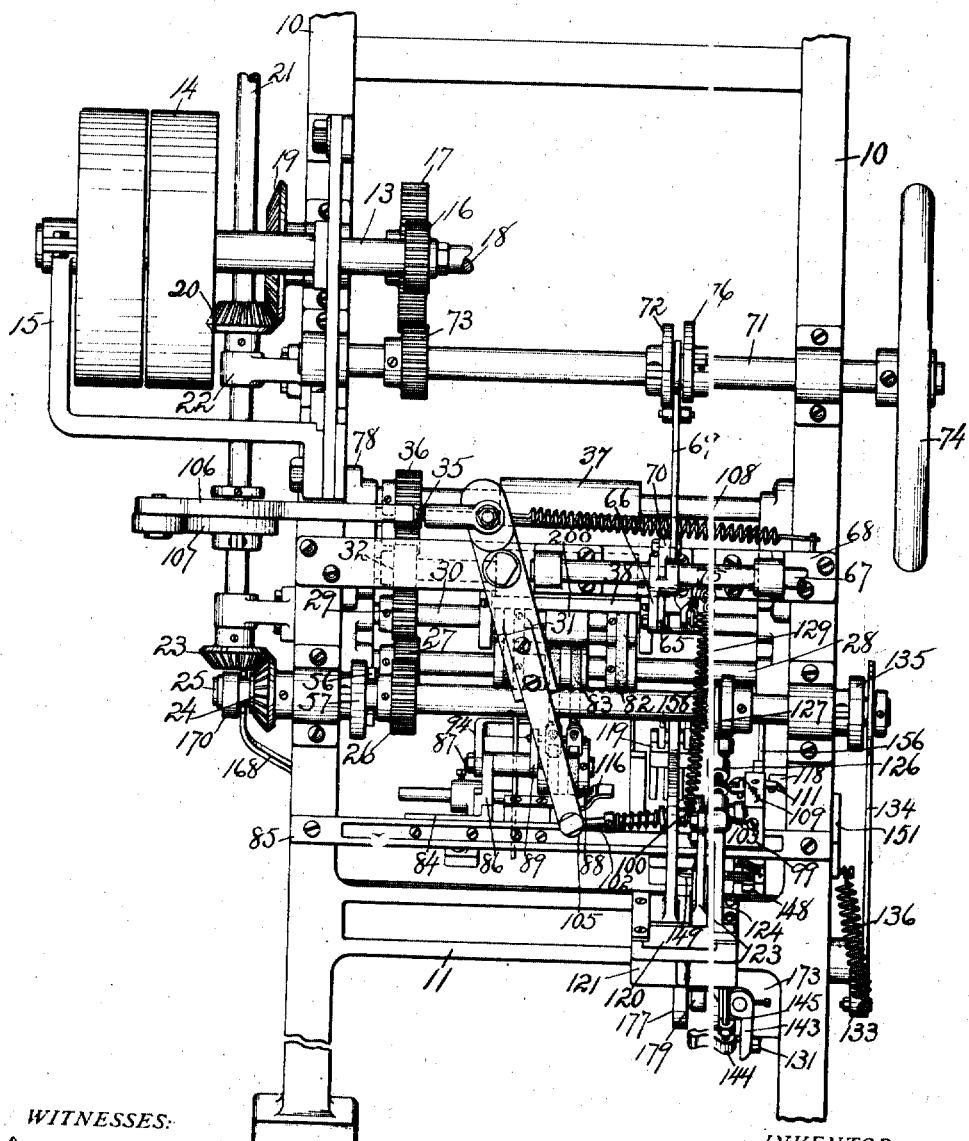
Figure 1 is a view in front elevation of that portion of an envelop machine embodying my invention, the point of view being located at right angles to the plane of the front of the machine and as indicated by arrows in Fig. 3.
Figure 8:
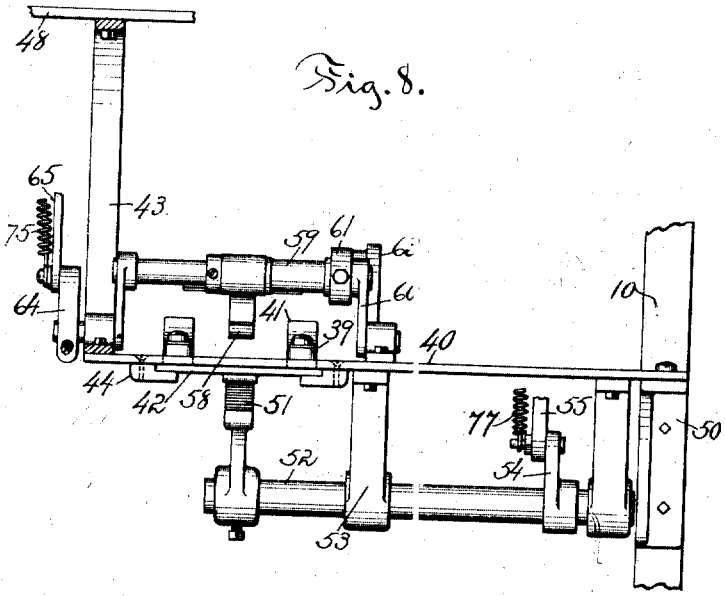
Fig. 8 is a detail view illustrating the construction of the flap folding mechanism.
Figure 10:
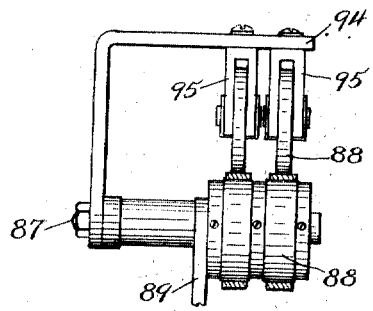
Fig. 10 is a detail view, looking downwardly, and illustrating the arrangement and construction of the delivery rolls.

The machine herein illustrated and embodying my invention is composed of a frame made up of various members and including side rails 10 rigidly connected in any suitable manner, such connections including a cross bar 11 and side bars 12. It will be understood that my invention herein illustrated and described constitutes part only of an envelop making mechanism, the other parts of the machine, not directly relating to the invention and supported above the parts herein illustrated and described, being omitted from the showing herein and therefore such parts of the frame as have no bearing upon the present invention are not designated by reference characters.

A driving shaft 13 is mounted in a bearing on one of the side rails 10 and is equipped with driving pulleys 14 operated in the usual manner, one end of the shaft being mounted in a bearing in a bracket 15. The shaft 13 has a pinion 16 secured thereto meshing with a gear 17 secured to a cross shaft 18 (shown as broken off), having bearings on the side rails. This shaft 18 has a bevel gear 19 secured thereto outside of the side rail and meshing with a bevel pinion 20 secured to a vertically arranged shaft 21 mounted in bearings 22 secured to the side rail, the lower end of this vertical shaft having a bevel pinion 23 meshing with a bevel pinion 24 on a cam shaft 25 mounted in bearings in the side rails 10. A pinion 26 secured to the cam shaft 25 meshes with a pinion 27 secured to the shaft 28 of one of a pair of intermediate rolls which are geared together, the pinion on the shaft of the other intermediate roll meshing with a pinion 29 on the shaft 30 of a diverting roll 31. The pinion 29 meshes with a pinion 32 on the shaft 33 of one of a pair of primary feed rolls that are also geared together, the pinion on the shaft of the other feed roll 34 of said pair meshing with a direction pinion 35 that meshes with a pinion 36 on the shaft of a supply roll 37 constituting one of a pair of said rolls.

The bearings for the supply rolls, primary feed rolls, diverting roll, and intermediate rolls, hereinbefore referred to, are located in bearing brackets 78 secured to the side rails and suitably formed to contain the bearings for said rolls. In the construction herein shown, the rear one of the primary feed rolls has its box 79 yieldingly supported and pressed as by means of a spring, as shown in Fig. 2, toward its tension feed roll. The box 80 of the diverting roll is also similarly mounted and forced toward the rear one of the pair of intermediate rolls, while the box 81 of one roll of the intermediate pair is so arranged that it presses both against its companion roll and against the diverting roll 31. The pair of supply rolls are of a length substantially equal to the width of the envelop to be formed, and they are located to deliver the envelop directly between the primary feed rolls which are also substantially of a length equal to the width of said envelop. The diverting roll and the forward roll of the pair of intermediate rolls is each composed of three members, each of which members on one roll shaft is located in line with a corresponding member on the other roll shaft, and a part of which members on each shaft are adjustably movable thereon and supported thereby and have means, as screws, for securing them thereto, as clearly shown in Fig. 11 of the drawings. A central member on each shaft is fixed thereto and the members on opposite sides of the central member are adjustably secured to their shafts. The members on opposite sides of the central member, or outside members, on each shaft are adjustably supported by and secured to the shafts, and belts 82 extend around and are supported by these outside members, and these belts are consequently supported by the shafts. A pair of feed belts 83 extend from the central member of said intermediate roll to and around the front one of a pair of delivery rolls, to be hereinafter described, the belts 83 being located comparatively close together.

In the making of envelops it is desirable at times to complete the packaging of the envelops with the flap unfolded, and in other cases it is desirable when the envelops are formed into the package that the flaps shall be folded. In my improved mechanism I provide means whereby either of these results may be obtained. When the machine is arranged to perform the first operation of packing the envelops with the flaps unfolded, the outer end members on the diverting roll and on the front roll of the intermediate rolls are moved longitudinally on their shafts and away from the central members, thus providing a space between the two belts 82 to permit an envelop to pass from the primary feed rolls directly to the intermediate rolls. To accomplish the first result the construction of the rolls just described is employed, the outside supporting members for the belts 82 on the shafts 28 and 30 being separated sufficiently to permit the envelops to pass from the primary feed rolls between the belts 82 directly to the intermediate rolls. In this operation the fixed and central member 200 of the diverting roll acts as a supporting member for the envelops in the direct feed from the primary to the intermediate rolls, whereas, in accomplishing the second result by passing envelops to the folding mechanism, now to be described, this member 200 acts as a feeding member, that is, it is a direct feed supporting member and also a diverting feed member.

In accomplishing the second result a guide 38 is removably located in a line between the meeting surfaces of the primary feed rolls, which include the roll 34 as one of the pair, and the meeting surfaces of the intermediate feed rolls which include the roll mounted on the shaft 28 as one of the pair, said guide being supported on brackets removably attached to a supporting bar 68 (see Fig. 3 of the drawings). This guide is so located that it will direct the envelops that are moved by the primary feed rolls into the throat between the diverting roll 31 and one of the primary feed rolls (see Fig. 3) from which the envelop is moved against a stop 39 secured to a slide 42 supported on a table 40, said stop having a lip 41 to overlie the envelop and hold it from rising from the table. In this position the flap of the envelop will lie upon the diverting roll 31.

The table 40 is supported in any suitable manner on the frame of the machine, as seen in Fig. 2, one edge being secured at the lower end of a bracket 43, the opposite edge being supported upon the edge of another bracket. Guides 44 are secured to the under side of the table, these guides having grooves in which the edges of the slide 42, or projections therefrom, engage, this slide being formed in two pieces (see Fig. 3) the upper one of which is located for reciprocating movement in an opening 45 in the table, the upper surfaces of the slide and table preferably being flush. There are preferably two of the stops 39, located at some distance apart on the slide, and the slide has two projecting bars 46 at its front end extending into slots 47 in the table 40 (see the dotted line in Fig. 3). In the construction herein shown the bracket 43 depends from a table 48 supported as upon a bracket 49 secured to one of the side rails of the machine, and the opposite end of the table 40 is supported upon a bracket 50 secured to one of the side rails.

A segment 51 is secured to a rock shaft 52 mounted in bearings 53 depending from the table 40, this rock shaft having an arm 54 to which a feed operating rod 55 is pivotally attached, this rod extending forward to the front of the machine and having a forked end 56 straddling the cam shaft 25 and operated as by means of a feed cam 57 on said shaft engaging a roller on the rod.

A folder 58 is pivotally secured to a older bar 59 secured at each end to rocking arms 60 having trunnions mounted in bearings, one on the table 40 and the other in the bracket 43. A guide bar 61 is also secured to the rod 59 and has a stud projecting into a guide groove 62 formed in a guide plate 63 secured to the table 40. A rocking arm 64 is secured to the trunnion of one of the rocking arms 60, preferably outside of the bracket 43 and this arm has a folder operating rod 65 pivotally connected therewith and extending to the front of the machine where it is pivotally connected with an arm 66 secured to a rock shaft 67 mounted in brackets on the hereinbefore mentioned supporting bar 68 secured to the side rails and projecting across the front of the machine. This shaft is operated as by means of a rod 69 pivotally connected with an arm 70 secured to the shaft 67, said rod having a forked end straddling a manually operated shaft 71 mounted in the side rails and having a folder cam 72 secured thereto and engaging a roller on the side of the rod 69. The shaft 71 is connected as by means of a pinion 73 with the gear 17, and this shaft also has a hand wheel 74 by means of which the machine may be manually operated to a limited extent.

It will be noted that in the operation of the mechanism above described, when the envelop has been projected against the stops 39 with the flap resting upon the diverting roll 31, timely operation of the folder by the spring 75 will bring the folder 58 into contact with the envelop at about the line on which the fold of the flap is to be made, and as the folder bar 59 is moved forward by the operation of the rocking arm 64 the guide slot 62 will direct the movement of the folder to tuck the envelop, with the flap folded, underneath the diverting roll 31 at which time the operation of the slide 42 by the cam 57 and connected mechanism will move the envelop forward between the diverting roll 31 and one of the intermediate rolls.

The folder cam 72 moves the folder operating rod and consequently the folder in one direction, the reverse or folding movement of these parts being caused by the hereinbefore mentioned folder spring 75 secured to the pivotal support of the rod at one end and to the frame (herein shown as to a bracket projecting from the bar 68) at the opposite end. The backward movement of the folder is however restrained and controlled by a folder restraining cam 76 secured to the shaft 71 in proximity to the cam 72, the rod 69 straddling the shaft between these two cams and having rollers engaging each of the cams, the cam 76 being so shaped as to restrain and control the backward movement of the folder to any required degree. A feed spring 77 having one end secured to the feed operating rod 55 and the opposite end to a fixed part of the frame is employed to impart feeding movement to the feed mechanism, the return movement being imparted by the feed operating rod 55 and cam 57.

As the envelops are successively passed between the diverting roll 31 and the rear one of the pair of intermediate rolls they pass under the feed belts 82, which as to one run are disposed in a curved line by passing over the rear one of the pair of intermediate rolls, as shown in Fig. 3 of the drawing. The envelops consequently pass between said belts and the rear one of the pair of intermediate feed rolls and downwardly to a pair of delivery rolls, being guided in such movement by the feed belts 83.

A bracket 84 is secured to a supporting cross bar 85 secured to the side rails and extending across the front of the machine, this bracket having a supporting arm 86 rising therefrom and the latter having a stud 87 secured thereto and projecting therefrom, this stud having the front roll 88 of opposing delivery rolls mounted thereon and receiving the belts 83 traveling from the intermediate roll. A tension roll arm 89 is also secured to the stud 87, the outer end of the arm having a pin 90 secured thereto to which pin tension roll hangers 91 are adjustably secured, these hangers being split as shown in Fig. 3 and adjustably held in position as by means of tension screws 92. Tension rolls 93 are mounted in the ends of the hangers to press against the feed belts 83, as shown in Fig. 3 of the drawing. A frame 94 is also secured to the stud 87 and projects backwardly around the delivery rolls, this frame having forked arms 95 projecting therefrom, each of said forks containing a roll 96 forming the rear members of the delivery rolls, these rear members in fact being comparatively thin disks.

Guide fingers 97 are also secured to the stud 87 and project downwardly therefrom in parallel relation to guide the envelops as they pass from the delivery rolls on to the receiving table 98 on which, in the operation shown, they are received on the edge having the flap, and from which location they are removed by the delivery fingers constructed and operated as follows:

A slide 99 is mounted on the cross bar 85, this slide having a jib projecting into a groove formed in the front of the cross bar as shown in dotted lines in Fig. 2, the slide resting upon the upper edge of the cross bar and having a guide flange at the back of the bar to assist in guiding the slide in its movement. A post 100 is swiveled in an ear projecting from the slide 99 and has a sleeve 101 secured thereto, projecting laterally thereof, in which sleeve a connecting rod 102 is longitudinally movable, a nut 103 on the end of the rod limiting its movement in one direction by engagement with the end of the sleeve and a spring 104 forcing the rod in one direction causing the nut 103 to lie normally against the sleeve, said spring pressing against a collar on the rod, as shown in Fig. 4 of the drawings. The rod 102 is pivotally connected with a finger operating lever 105 pivotally mounted on the bar 68, its upper end being pivotally attached to a bar 106 extending to one side of the machine and straddling the shaft 21, the end of this bar having a roll in engagement with the finger operating cam 107 secured to the shaft 21. A spring 108 draws the lever in a direction opposite to that in which it is moved by the cam 107, the force of the spring being thus operated to move the fingers forward to grasp an envelop, and the cam moving said fingers backwardly to deliver the envelops in position to be operated upon by a pusher to be hereinafter described. The slide 99 has a finger supporting arm 109 bearing a rigid finger 110 and a movable finger 111 pivotally mounted on the arm and drawn toward the rigid finger by a spring 112. A holding lever 113 is pivotally mounted on the finger 110, and has a shoulder 114 arranged to engage the movable finger to hold it away from the rigid finger and as shown in Fig. 4 of the drawing, the slide 99 in this view being at a point intermediate its extreme limits of movement. A supporting projection 115 extends from the rigid finger 110 to support the movable finger in its movement, and there may be two of these projections located one on each side of the movable finger. A finger releasing cam 116 is supported by the cross bar 85 and is located in position to engage the holding lever 113, as the slide 99 is moved toward said cam, disengaging the shoulder 114 from the movable finger and permitting the spring 112 to move the fingers together, and grasp the envelop, the finger 111 being thus released after the slide has reached a point to locate an envelop 117 between the fingers. As the slide is moved in the opposite direction, carrying with it the envelop, a roller on the end of the movable finger 111 engages an envelop releasing cam 118 secured to a bracket 151 projecting from one of the side rails 10, this cam being located to move the finger 111 away from the rigid finger when the envelop has reached a position in front of a pusher 119.

This pusher is mounted on a pusher slide 120 mounted on a pusher slide bracket 121 secured to the cross bar 11 and having a rack 122 engaged by a toothed segment 123 on the end of a pusher slide lever pivotally mounted at the upper end of a standard 124 rising from the bracket 121. The pusher slide lever includes a bent arm 125 pivotally connected with a pusher slide cam rod 126, the end of which is forked, straddling the shaft 25 and having a roller in engagement with a pusher slide cam 127 secured to the shaft 25. The rod 126 is made in two sections adjustable longitudinally one with respect to the other by means of an adjusting screw 128 constructed with a right and left hand screw thread engaging the rod sections in a well known manner. The cam operates the pusher slide in a direction to move the envelops from the position in which they have been left by the delivery fingers and a spring 129, operates the parts to move the slide in the opposite direction, the pusher moving the envelops against a weighted rest 130 or envelops located against said rest, mounted to move under the influence of the pusher on to the table 98, this rest being shown as pushed back in Fig. 2.

The fingers 110 and 111 and the pusher 119 have reciprocating movements in transverse paths, the path in which said fingers move to present an envelop from the delivery rolls (including the roll 88) extending across the path of movement of an envelop under the influence of the pusher (see Fig. 1 of the drawings), and the pusher 119 being located higher than said fingers (see Fig. 2 of the drawings) consequently passing over the path of said fingers. This arrangement enables an increase in the rapidity with which the machine may be operated, as it is not required to move the fingers out of the way of the pusher before the latter begins its advance movement.

The flexibility of the material of which the envelops are composed and the construction of the envelops causes a tendency in the pile of envelops against the rest 130 to expand, and to thus move toward the pusher 119. In order to overcome this a holder is provided to prevent this expansion the holder being in engagement with the front of the pile except at the instant when the envelop is being moved into the pile by the action of the pusher.

A pocket formed by the side parts 152—153 and a front part 154 of the table 98 contains the pile of envelops lying against the rest 130, the side parts being secured to the table in any suitable manner. In arranging the holder for this pile of envelops an extension 155 from the upper edge of the side 152 is formed, this extension having a groove in which a supporting arm 156 is located, this arm having a groove to receive a set screw, as plainly shown in Fig. 2, by means of which the position of the upper end of the arm may be adjusted to various heights. A holding lever 157 for the upper edge of the pile of envelops is pivotally attached to a lever 190 secured to a rock shaft 191 mounted at the upper end of this arm, and it has holding fingers 158 located to be moved into position in front of the pile of envelops to retain them in place. Other holding fingers 159 project from an operating holder lever 160 pivotally mounted on a rock shaft 161 mounted in bearings 162 extending from the back edge of the section 154 of the table hereinabove referred to. The levers 157 and 160 are connected by an extensible rod 163 pivotally attached to each lever, the sections of the rod being extensible one with respect to the other as by means of adjusting and clamping screws in one section projecting through a slot in the opposite section, as clearly shown in Fig. 2 of the drawings. An arm 164 is secured to the shaft 161 and projects into the path of movement of one arm 165 of a holder operating lever, including said arm, a rock shaft 167 (mounted in a bracket 166 secured to the back of a counter frame to be hereinafter described) and an arm 169 secured to the opposite end of said shaft. A holder operating rod 168, pivotally connected with the arm 169, projects forward to and has a forked end straddling the cam shaft 25 (see Fig. 1 of the drawing), this forked end having a roller located in contact with a holder operating cam 170 secured to the shaft 25 and by means of which the holder fingers, hereinabove described, are operated. A spring 171 moves the holder operating rod in a direction opposite to that by which it is moved by the cam 170 and a spring 172 holds the arm 164 against the holder operating lever arm 165.

The above description has included a number of fingers at the top edge and also at the bottom edge of the pile of envelops, and it will be understood that as many of these fingers as desired may be employed along the top and bottom edges of the pile of envelops, said fingers being supported in any suitable manner to coöperate with those above described. The cam 170 is suitably formed and timed to hold the fingers normally in front of the pile of envelops substantially all the time except when an envelop is moving across the path of said fingers, and to remove them from this position simply at the time of such passage of the envelops between the top and bottom fingers, that are returned immediately thereafter, the pusher 119 being slotted to permit its backward movement when the fingers are in place in front of the pile of envelops, said fingers being passed through said slots in the backward movement of the pusher.

A ratchet or counter wheel 131 is mounted loosely on a shaft 138 having a bearing in a bracket 132 secured to a side bar 12, an arm 133 secured to this shaft being pivotally connected to a counter operating rod 134, one end of which is forked to straddle the cam shaft 25 and having a roller in engagement with a counter cam 135 on said shaft, the cam moving the counter in one direction and a spring 136 moving it in the opposite direction. A pawl supporting arm 137 is secured to the ratchet shaft 138, above referred to, and a pawl 139 is pivotally mounted on the end of the arm 137 in position to engage the teeth of the counter wheel, of which, in the construction herein shown, there are forty-eight.

The cam shaft 25 is so timed in its rotation that a movement is imparted to the pawl 139 to move the counter wheel a one step movement each time an envelop is moved into the pile by the pusher 119. In order to prevent a movement of the counter wheel in case an envelop should not be moved into the pile in any movement of the pusher, a guard 140 rests normally under a projection 141 from the pawl, this holding it normally disengaged from the ratchet teeth. This guard is fastened to a disk 142 secured to a shaft mounted in a bracket 173 secured to one of the side bars 12, an operating finger 143 being also secured to this shaft and extending into the path of movement of a lever 144 secured at the lower end of a shaft 145 mounted in said bracket and having at its upper end a finger 146 located in the path of movement of the envelops as they are moved forward by the pusher.

From this it will be noted that at the instant the pawl 139 is given a feeding movement, if an envelop is being moved by the pusher the guard 140 will be moved from under the projection 141 and the pawl will thus engage the teeth of the ratchet and move it forward one step. The weight of the finger 143 and other parts, will, under ordinary conditions, be sufficient to return the guard to its normal position, and in order to remove any obstruction to this movement a finger 147, secured to the shaft 145, extends into the path of movement of a slide 148 mounted on the bracket 121 and having a lever 149 projecting into the path of movement of a stud 150 on the pusher 119. From this it will be noted that each time the pusher is moved backward, the slide 148 will engage the finger 147 and move it to the position shown in Fig. 5 so that the lever 144 is out of the path of movement of the operating finger 143 and thus is no obstacle to the movement of that lever. The slide 148 is moved backward by a spring 174.

The bracket 132 supports a counter frame including cross bars 175 at the top and a back piece 176, a side part 177 of the frame being secured to and supported by said top cross bars and the back piece 176, as clearly shown in Fig. 5. The ratchet or counter wheel has a sleeve 178 by means of which said wheel is loosely mounted on the shaft 138, and a brake arm 179 extends from the bottom of the back piece 176 and has any suitable form of brake engaging said sleeve, as shown in dotted lines in Fig. 6, to hold the ratchet or counter wheel against backward movement.

A designating device for determining the number of envelops to be contained in each package is mounted in connection with the counter or ratchet wheel, and this designating device includes a designating finger 180 located at one side of the pile 181 of envelops. At certain intervals, at the end of which a predetermined number of envelops shall have been moved into the pile, this finger will move laterally to push the last envelop received into the pile inwardly to a certain extent so that the next preceding envelop, which will be the first envelop in the next package, will project beyond the envelop which has been pushed inward and that is the last envelop of the preceding package, and this finger is so mounted that the edge of the package of envelops which has been operated upon by the finger will be disposed obliquely or in curved line to the front face of the pile, as shown at 189 in Fig. 7 of the drawings. In the device as herein shown, the designating finger 180 is secured to a designating finger shaft 182 mounted at its lower end in one of the cross bars 175, a designating finger lever 183 secured to this shaft having in its end a pin projecting into the path of movement of a designating finger bar 184 pivotally secured to the other cross bar 175, as shown in Fig. 6 of the drawings, a designating finger spring 185 holding said pin in contact with the lever 184. A stud 186 projects from the bar 184 into a cam groove 187 in a cam disk 188 secured to the sleeve 178 of the ratchet or counter wheel. This cam will be so formed that it will operate the bar 184 at any predetermined time with respect to the rotary movement of the counter wheel, as herein shown, the bar being operated at each complete rotation of said wheel, which wheel in the construction herein shown, contains forty-eight teeth, and the designating finger 180 being operated at each rotation of the wheel, said finger will designate forty-eight of four dozen envelops to be contained in each package.

In the specific construction of the holding fingers herein shown, the rock shaft 191 is mounted in bearings 192 on the bent part 193 of the supporting arm 156, and the fingers 158 depend from arms secured to the rock shaft, as shown in Fig. 2 of the drawings. The fingers 159 for engaging the lower edges of the envelops are secured to a supporting bar 194 projecting at an angle to the holder lever 160, and from the end thereof.

An envelop stop 195 is secured upon the table 98 in the path of movement of the envelops by the fingers 110—111, this stop having a bearing for the upper end of the shaft 145. The stop 195 is so located that the envelop will strike against it just after the fingers 110—111 have released their grasp.

In addition to the holding fingers hereinabove described the side 153 has a lip 196 at its front edge behind which a portion of the pile of envelops is moved by the action of the designating finger 180.

It will be noted that the construction of the pawl controlling mechanism, consisting of the finger 146, guard 140, &c., is such that they may be operated by the application of little power sufficient merely to overcome the slight friction in the bearings of the several parts, the return of the parts to their normal position being insured by positive means. As the power to operate this mechanism is transmitted by the envelops an advantage arises in that the little resistance offered in the operation of this mechanism avoids marks upon the envelops, which marks would be formed on the goods were any great amount of force required to operate the mechanism by contact with the envelops.

I claim:

1. In a folding machine, a pair of feed rolls, a second pair of feed rolls positioned to receive an article directly from the first pair, means for guiding an article out of the path between said feed rolls, mechanism to operate upon said article, and a diverting roll positioned to coact with a roll of each of said pairs in moving an article to and from said mechanism.

2. In a folding machine, a pair of feed rolls, a second pair of feed rolls arranged to receive an article in the shortest path directly from the first pair, mechanism to operate upon said article, and a diverting roll coacting with a feed roll of one of said pairs to deliver an article to said operating mechanism, said diverting roll also coacting with a feed roll of the other pair to deliver said article from said operating mechanism and in a different path.

3. In a folding machine, a pair of feed rolls, a second pair of feed rolls relatively arranged with respect to the first pair, a diverting roll traveling in contact with a roll of each pair of feed rolls, means for guiding an article from the first pair of feed rolls in one path to the diverting roll, and means for delivering an article entirely in another path to the diverting roll and the second pair of feed rolls.

4. In a folding machine, a pair of feed rolls, a second pair of feed rolls arranged to receive an article directly from the first pair, a diverting roll positioned in driving contact with one of said feed rolls, a folder mechanism, means for guiding an article from the first pair of feed rolls to the diverting roll and the folder mechanism, and means for delivering an article from the folder mechanism to the diverting roll and second pair of feed rolls.

5. In a folding machine, a pair of feed rolls, a second pair of feed rolls arranged to receive an article traveling in a straight path directly from the first pair, a diverting roll rotating in contact with one roll of each of said pairs, a guide removably positioned between the first pair of feed rolls and said diverting roll, mechanism for operating upon an article delivered from the first pair of feed rolls and the diverting roll, and means for delivering the article into the bight between the second pair of feed rolls and diverting roll.

6. In a folding machine, a pair of feed rolls, a second pair of feed rolls arranged to receive articles directly from the first pair, a diverting roll including a member fixed on its shaft and a member movable thereon, said diverting roll being positioned to coöperate with a member of said first pair of feed rolls to feed a blank by one path to operating mechanism, means for securing the movable member to the shaft, mechanism for operating upon an article delivered to it by the diverting roll, and means for delivering said article by an entirely different path to the diverting roll and a member of the second pair of feed rolls after such operation.

7. In a folding machine, a pair of feed rolls, a diverting roll including a member fixed to its shaft, members adjustably movably supported by said shaft on opposite sides of said fixed member, means for securing the movable members to the shaft, said diverting roll being positioned to coöperate with a member of said feed rolls in moving a blank, a folder mechanism to receive articles from said diverting roll, and means for delivering the articles from said folder mechanism to the diverting roll in an entirely different path from that in which it was delivered to said folding mechanism.

8. In a folding machine, a pair of feed rolls, a diverting roll including a member fixed to its shaft and a member adjustably movably supported thereby, means for securing the movably mounted member to said shaft, a second pair of feed rolls arranged to receive articles directly from the first pair, one of the second pair consisting of a member adjustably movably supported thereby by its shaft, means for securing said movably mounted member to the shaft, operating mechanism to perform an operation upon an article delivered from the diverting roll, and means for delivering an article from said operating mechanism to the diverting roll.

9. In a folding machine, a pair of feed rolls, a diverting roll including a member fixed on its shaft and members adjustably movably supported thereby on opposite sides of the fixed member, means for securing said movable members in place, a second pair of feed rolls including members adjustably movably supported by the shaft of one of said feed rolls to register with the movably mounted members of the diverting roll, means for securing the movably mounted members of the second pair of feed rolls, means for operating upon an article delivered from said diverting roll, and means for delivering an article from said operating mechanism to the diverting roll.

10. In a folding machine, a pair of feed rolls, a diverting roll including a member fixed to the shaft and a member adjustably movably supported by said shaft thereon, operating mechanism for envelops delivered by the diverting roll, means for passing the articles from the operating mechanism to the diverting roll, a second pair of feed rolls, one of which has a member adjustably movably supported by its shaft, and a belt passing about said movable members of each of said rolls.

11. In a folding machine, a pair of feed rolls, a diverting roll including a member fixed to a shaft and members adjustably movably supported by said shaft on opposite sides of the fixed member, a second pair of feed rolls including a member fixed to a shaft and adjustably movable members supported thereby, said diverting roll coöperating with a member of each pair of feed rolls in feeding a blank, belts passing about said movably mounted members of each of said rolls, means for directing a blank to one side of said diverting roll, and means for directing said blank in an entirely different path to the opposite side of said diverting roll.

12. In a folding machine, a pair of feed rolls, a diverting roll including a member fixed to its shaft and members adjustably movably supported thereby on opposite sides of the fixed member, a guide for delivering articles to said diverting roll, mechanism to operate upon articles taken from the diverting roll, means for delivering articles from said operating mechanism to the diverting roll, a second pair of feed rolls one of which has a member fixed to its shaft and other members adjustably movably supported thereby, and belts passing about the movably secured members of each of said rolls.

13. In a folding machine, a pair of feed rolls, a diverting roll including a member secured to the shaft and members adjustably movably fixed thereto, a pair of intermediate rolls one of which has a member secured to its shaft and members adjustably movably secured thereto, said diverting roll coöperating with a member of each of said pairs of feed rolls in feeding a blank, a belt passing around the members movably fixed in place, a pair of delivery rolls, a belt passing about the fixed members of the intermediate rolls and said delivery rolls, means for directing a blank to one side of said diverting roll, and means for directing said blank in an entirely different path to the opposite side of said diverting roll.

14. In a folding machine, a pair of feed rolls, a diverting roll including a member fixed to its shaft and members adjustably movably secured thereto on opposite sides of the fixed member, means for guiding articles to the diverting roll, means for operating upon said articles, means for passing articles from the operating mechanism to the diverting roll, a pair of intermediate rolls one of which travels in contact with the diverting roll, the other of which has a member fixed to its shaft and members adjustably movably secured thereto, belts passing about the movably secured members of each of said rolls, a pair of delivery rolls, and a belt passing from the fixed member of the intermediate rolls about said delivery rolls.

15. In a folding machine, a slide, fingers mounted on said slide, a roll to deliver an envelop against said fingers that are positioned to retain the envelop upon said roll, a folder positioned to engage the envelop and force it underneath said roll, a roll in engagement with the first mentioned roll, and means for moving the slide to deliver the envelop between said rolls.

16. In a folding machine, a slide, means for operating the slide, a roll to deliver an envelop to said slide, fingers secured to the slide and projecting toward said roll to receive an envelop therefrom resting upon the roll, a folder positioned to engage the envelop while resting on said roll and to tuck it thereunder, a finger secured to said folder and projecting toward the fingers on the slide, means for operating the folder, and means for removing an envelop therefrom.

17. In a folding machine, a table, a slide movably mounted on said table, a roll to deliver articles to and to remove them from said slide, fingers upstanding from the slide to receive said articles with one edge resting upon the roll, a folder to tuck the articles underneath said roll, and means for operating said slide.

18. A feeding roll, a diverting roll located underneath said roll to coact therewith in the feeding operation, a table, a slide movably supported by the table to receive articles from said rolls, a folder to tuck articles underneath said diverting roll, and means for operating the slide to cause removal of articles therefrom.

19. A pair of feed rolls, a diverting roll located underneath one of said feed rolls and coacting therewith in the feeding operation, a table, a slide movably supported by the table to receive articles from said feed rolls, a folder to tuck articles underneath said diverting roll, and means for operating the slide to cause removal of articles therefrom.

20. A diverting roll, means for feeding articles to said roll, a table, a slide movably supported by the table to receive articles from said diverting roll, a folder to tuck articles underneath said roll, and a delivery roll located underneath and in contact with said diverting roll to remove articles from said slide.

21. A diverting roll, means for feeding articles to said roll, a slide to receive articles from said diverting roll, means for operating the slide, a folder to tuck articles underneath the diverting roll, and a pair of delivery rolls, one of which coacts with the diverting roll to remove articles from said slide.

22. A pair of feed rolls, a table, a slide movably supported by the table, a diverting roll located underneath one of said feed rolls to deliver articles to said slide, fingers upstanding from the slide to receive said articles, and means for operating the slide, to cause delivery of articles therefrom.

23. In a folding machine, a pair of feed rolls, a second pair of feed rolls positioned to receive an article traveling in a straight path from the first pair of feed rolls, a diverting roll rotating in driving contact with a roll of one of said pairs of feed rolls and driven thereby and positioned to act in diverting the article out of said straight path and to co-act with a roll of the other pair of feed rolls to conduct it back to said path, and means for operating upon the article when diverted from said straight path.

24. In a folding machine, a pair of feed rolls, a second pair of feed rolls positioned to receive an article traveling in a straight path directly from the first pair of feed rolls, a diverting roll located in driving contact with one of said feed rolls and driven thereby and positioned to conduct an article from said straight path upon one side of the diverting roll to an operating mechanism and to conduct said article from said operating mechanism and on the opposite side of said diverting roll back into said path and to the second pair of feed rolls, and mechanism for operating upon said article presented to it by the diverting roll.

25. In a folding machine, a pair of feed rolls, a second pair of feed rolls positioned to receive articles from said first pair, a diverting roll including a member fixed to a shaft and a member adjustably movably supported by said shaft and in one position located in the path of feed from the first to the second pair of feed rolls, means to permit movement of said movable member to render it inactive as a feed member, and means for operating upon the article presented by said diverting roll.

26. In a folding machine, a pair of feed rolls, a second pair of feed rolls arranged to receive articles from the first pair of feed rolls, a diverting roll including a member fixed on a shaft and a member adjustably movably secured thereto, feeding means supported by said movable member and in one position located in the path of feed of an envelop between said pairs of feed rolls, means to permit movement of said movable member to render said feeding means inactive as a feeding means, and means for operating upon articles presented to it by said diverting roll.

27. In a folding machine, a pair of feed rolls, a second pair of feed rolls positioned to receive articles from the first pair, a diverting roll including a member fixed to a shaft and members adjustably movably supported thereby upon opposite sides of said fixed member and in one position located in the path of feed between said pairs of feed rolls, means to permit movement of said movable members to render them inactive as feed members, and means for operating upon an article presented to it by said diverting roll.

28. In a folding machine, a pair of feed rolls, a second pair of feed rolls arranged to receive articles from the first pair and including a member fixed upon a shaft and a member movably secured thereto, a diverting roll positioned to coöperate with a feed roll of one of said pairs and including a member fixed on its shaft and a member movably secured thereto, a feeding member supported by the fixed members of the diverting roll and feed roll, a feed member supported by the members movably secured to said feed and diverting rolls, means to secure each of said movable members in a position to render said feed member supported thereby inactive as an obstruction and as a feed member, and means for operating upon an article delivered to it by said diverting roll.

29. In a folding machine, a pair of feed rolls, a second pair of feed rolls arranged to receive articles directly from the first pair, a diverting roll located in driving contact with a member of said first pair of feed rolls and driven by frictional contact therewith to feed a blank by one path to operating mechanism, mechanism for operating upon an article delivered to it by the diverting roll, and means for delivering said article by an entirely different path to the diverting roll and a member of the second pair of feed rolls after such operation.

30. In a folding machine, a pair of feed rolls, a diverting roll including a member fixed to its shaft and feed members adjustably movably supported by said shaft on opposite sides of the fixed member and in one position located in the path of feed of an envelop from said pair of feed rolls, means to permit positioning of said movable feed members to render them inactive as feed members, a folder mechanism to receive articles from said diverting roll, and means for delivering articles from the folder mechanism to said diverting roll.

31. In a folding machine, a pair of feed rolls, a second pair of feed rolls positioned to receive an article traveling in a straight path from the first pair of feed rolls, a diverting roll traveling in contact with a roll of each of the pairs of feed rolls, and means for operating upon articles presented to it by said diverting roll.

32. In a folding machine, a pair of feed rolls, a diverting roll, a second pair of feed rolls, feed belts passing around the diverting roll and one of the second pair of feed rolls, means for separating the belts to permit passage of an article between them from one pair of feed rolls to the other pair of feed rolls, and means for operating upon a blank presented to it by said diverting roll.

33. In a folding machine, a pair of feed rolls, a diverting roll including a member secured to the shaft and members movably secured thereto, a pair of intermediate rolls, one of which has a member secured to its shaft and members movably secured thereto, said diverting roll coöperating with a member of each of said pairs of rolls in feeding a blank, feed belts passing around the members movably fixed in place whereby the belts are separable to permit passage of a blank between them a pair of delivery rolls, a feed belt passing about the fixed member of the intermediate rolls and one of said delivery rolls, and means for operating upon a blank presented to it by said diverting roll.

34. In a folding machine, a slide, fingers mounted on said slide, a roll acting in the delivery of a blank against said fingers and in its removal therefrom, said fingers being positioned to retain the blank upon said roll, a folder positioned to engage the blank to force it underneath said roll, and means for moving the slide to move the blank against said roll.

35. In a folding machine, a pair of feed rolls, a second pair of feed rolls positioned to receive articles directly from the first pair, a diverting roll, feed belts passing around the diverting roll and one of the second pair of feed rolls and adjustably supported by said rolls, and in one position located in the path of feed of an envelop from one to the other of said pairs of feed rolls, fixed feed members on the diverting roll and one of said second pair of feed rolls, and means for separating said belts to permit passage of an article between them.

36. In a folding machine, a pair of feed rolls, a second pair of feed rolls positioned to receive articles directly from the first pair, a diverting roll coöperating with said feed rolls, said diverting roll and one of the second pair of feed rolls each having a fixed feed member, adjustably mounted feed members secured to said diverting and feed rolls on opposite sides of said fixed feed members, said adjustably mounted feed members, in one position, being located in the path of movement of an envelop from one to the other of said pairs of feed rolls, and belts passing around said movably mounted feed members whereby the belts may be separated to permit passage of an article between them.

37. In a folding machine, a pair of feed rolls, a second pair of feed rolls, a diverting roll including a member fixed to its shaft, members adjustably supported on opposite sides of said fixed member and in one position located in the path of feed of an envelop from one to the other of said pairs of feed rolls, means for securing the adjustably supported members to the shaft, a folder mechanism to receive articles from said diverting roll, and means for delivering the articles from said folder mechanism to the diverting roll.

38. In a folding machine, a pair of feed rolls, a diverting roll coöperating with one of said feed rolls in the feeding operation and including a member fixed to a shaft and members movably secured to the shaft on opposite sides of the fixed member, a second pair of feed rolls including a member fixed to a shaft and movable members secured thereto, and belts passing about the movably mounted members of each of said rolls and in one position located in the path of feed of an envelop from one to the other of said pairs of feed rolls.

39. In a folding machine, a pair of feed rolls, a diverting roll including a member secured to its shaft and members movably fixed thereto, a pair of intermediate rolls one of which has a member secured to its shaft and members movably secured thereto, a belt passing around the members movably fixed in place, a pair of delivery rolls, and a belt passing about the fixed member of the intermediate rolls and of said delivery rolls.

40. In a folding machine, a folding mechanism including a roll acting in the delivery of an envelop to and in its removal from folding mechanism, a slide, stop fingers positioned on said slide to receive an envelop with its edge supported by said roll, a folder positioned to engage the envelop and tuck it underneath the roll, and means for operating the slide to move the envelop against said roll.

41. In a folding machine, a folding mechanism including a diverting roll comprising a feed member fixed to its shaft and feed members adjustably supported on said shaft, the latter, in one position, located in the path of travel of an envelop from one to the other of said pairs of feed rolls, means for directing a blank to said diverting roll and all of said feed members, means for positioning the movable feed members to render them inoperative as feed members, and means to receive the blank from said feed members.

42. In a machine for folding paper articles, a reciprocating pusher comprising an arm positioned to engage at its outer end an article to be moved, means to deliver an article to said pusher, said pusher and delivering means moving in transverse paths and in different horizontal planes and the latter moving to the opposite side of the path of the former, means for operating the pusher, and means for operating the delivering means.

43. In a folding machine, a set of feed rolls, means for pressing said rolls toward each other, a diverting roll, a second set of feed rolls, said diverting roll being arranged in line between two rolls, one of each of said pairs of feed rolls, and in driving contact with a roll of each pair of said feed rolls, a member for pressing one of said second set toward its companion member and toward the diverting roll, means for supplying blanks to said rolls, and means for removing blanks from said rolls.

44. In a folding machine, a diverting roll, means for delivering blanks thereto, means for stopping movement of the blanks with one edge resting upon the diverting roll, a folding blade having a movement back and forth, means for moving said blade, a cam plate having a cam to cause operation of the blade in its back and forth movement to tuck the blank under the diverting roll, and means for removing the blank from the diverting roll.

45. In a folding machine, a diverting roll, means for feeding a blank thereto, means for stopping the blank with one edge resting upon the diverting roll, a folding blade having an oscillating movement, means for oscillating the blade, a cam plate having a cam slot arranged to move the blade to conduct a blank underneath the diverting roll, and means for removing a blank from the diverting roll.

46. In a folding machine, a diverting roll having a feed member fixed to its shaft and feed members movably mounted on said shaft, a pair of feed rolls one of which has members movably mounted on its shaft and a feed member fixed thereto, belts passing around the movably mounted feed members on the diverting roll and on said feed roll shaft, a second pair of rolls, and belts passing from the fixed feed member on one of the first mentioned pair of feed rolls, around one of the rolls of the said second pair of rolls.

47. In a folding machine, a pair of feed rolls, means for supplying blanks to said rolls, a pair of delivery rolls to which the blanks are fed by the feed rolls, said delivery rolls having their axes parallel with the axes of said feed rolls, one member of the delivery rolls being composed of disks arranged opposite the other member, said disks being rotatable independently each of the other and by frictional contact with said blanks, means for operating the rolls, and means for removing blanks from the delivery rolls.

48. In a folding machine, a pair of feed rolls, a delivery roll mounted to receive blanks delivered to it by the feed rolls, the axes of the shafts of all of said rolls being arranged parallel, a frame having forked supports separately formed, disks mounted in bearings in said forks and comprising the second member of the delivery rolls, said disks being rotatable independently each of the other and by frictional contact with said blanks, and means for operating said rolls.

49. In a folding machine, a frame, a set of feed rolls mounted in said frame, a slide movable crosswise of the frame and having means to remove blanks from underneath the feed rolls, a slide operating member pivotally mounted upon the frame in front of the feed rolls, and operatively connected with said slide, a shaft mounted at the side of the machine, connections between said shaft and said feed rolls, and means upon said shaft for operating said slide operating member.

50. In a folding machine, a set of feed rolls, folding mechanism located appurtenant to said feed rolls to receive blanks therefrom and including a reciprocating folder, and means for operating said folder, said means including a cam for forcing the folder in one direction, a cam for controlling the movements of the folder in the opposite direction, and means for moving the folder in said opposite direction and to press an operating member against said cam.

51. In a folding machine, a frame, a set of feed rolls mounted in the frame, a cross bar extending across the front of the frame, a slide mounted upon said cross bar and having means to remove a blank from underneath the feed rolls, a second cross bar, a bracket secured to the second cross bar and having a slideway, a second slide mounted in said slideway, means for operating the second slide to act upon a blank, a lever pivotally mounted in the front of the machine and connected with the first mentioned slide, and means for operating said lever.

52. In a folding machine, a frame, a set of feed rolls mounted in the frame, a diverting roll, means for operating upon a blank delivered by the diverting roll from the feed rolls, means for returning the blank to said diverting roll and other feed rolls, means for receiving the blank from the feed rolls resting on its edge thereunder, means for moving the blank resting on its edge from underneath the feed rolls to a position remote therefrom, a table, means for moving the blank from said position on to said table, and resting on its edge thereon, and means for supporting the blank on its edge on said table.

53. In a folding machine, a pair of feed rolls, a second pair of feed rolls positioned to receive an article traveling in the shortest path from the first pair, a diverting roll located in driving contact with one of the second pair of feed rolls, means for guiding an article from the first pair of feed rolls to said diverting roll, mechanism to operate upon said article, and means for moving the article from said operating mechanism to said diverting roll and the second pair of feed rolls.

54. In a folding machine, a pair of feed rolls, a second pair of feed rolls arranged to receive an article from the first pair, a diverting roll traveling in contact with a roll of each pair of feed rolls, means for guiding an article from the first pair of feed rolls to the diverting roll, and means for delivering an article to the diverting roll and the second pair of feed rolls.

55. In a folding machine, a pair of feed rolls, a second pair of feed rolls, an operating mechanism, a diverting roll located between the pairs of feed rolls and including a member fixed on the shaft of said diverting roll and acting as a support in direct feed of an envelop between said pairs of feed rolls and as a feed member in passing envelops from the first pair of feed rolls to said operating mechanism and back to said second pair of feed rolls.

56. In a folding machine, a pair of feed rolls, a second pair of feed rolls, an operating mechanism, a diverting roll located between the pairs of feed rolls and including a member fixed on the shaft of said diverting roll and acting as a support in direct feed of an envelop between said pairs of feed rolls and as a feed member in passing envelops from the first pair of feed rolls to said operating mechanism and back to the second pair of feed rolls, said diverting roll also including members adjustably movably secured to said shaft on opposite sides of said fixed member and inactive in direct feed and active in the diverted feed of an envelop.

HENRY B. COOLEY.

Witnesses:
 ARTHUR GROT I,
 OSCAR SEGALOWITZ.